United States Patent [19]

Laesser

[11] 4,110,744
[45] Aug. 29, 1978

[54] PASSIVE ELECTRO-OPTIC DISPLAY CELL

[75] Inventor: Claude Laesser, La Chaux-de-Fonds, Switzerland

[73] Assignee: Ebauches S.A., Neuchatel, Switzerland

[21] Appl. No.: 654,941

[22] Filed: Feb. 3, 1976

[30] Foreign Application Priority Data

Feb. 10, 1975 [CH] Switzerland .................. 1590/75

[51] Int. Cl.² .................................... G09F 9/32
[52] U.S. Cl. .......................... 340/336; 350/356; 340/324 R
[58] Field of Search .............. 340/336, 324 R, 324 M; 350/160 LC

[56] References Cited

U.S. PATENT DOCUMENTS

| 3,614,771 | 10/1971 | Band et al. | 340/336 |
| 3,760,403 | 9/1973 | Kippenhan | 340/336 |
| 3,781,863 | 12/1973 | Fujita | 340/336 |
| 3,831,166 | 8/1974 | DeNardo | 340/336 |
| 3,877,015 | 4/1975 | Kanazaki et al. | 340/336 |

Primary Examiner—Marshall M. Curtis
Attorney, Agent, or Firm—St. Onge, Mayers, Steward & Reens

[57] ABSTRACT

A passive display cell is described on which a plurality of digits are located. The digits are composed of electrode segments opposite counter-electrodes. These are connected in a manner enabling reduction of the number of outputs. As described with respect to the embodiments, the digits are arranged in separate groups with a pair of counter-electrodes for each digit in one group being also connected to counter-electrodes of another digit in another group. A pattern of conductor leads are employed and located in a non-crossing manner to connect like electrode segments to provide a multiple digit display cell having a low number of outputs.

3 Claims, 3 Drawing Figures

PASSIVE ELECTRO-OPTIC DISPLAY CELL

The present invention relates to a passive electro-optic display cell having at least two digits, intended to be used in multiplexing arrangements.

The multiplexing of digits in a passive electro-optic display cell permits a reduction of the number of outputs from such cell. Multiplexing, however, raises problems which have not been settled satisfactorily up to now. For example, one has thought to externally connect the individual segments of a single digit cell, where there is more room than in the cell. With an arrangement for a cell having eight digits, for instance, the outputs from a multiplexed display cell total 64, including 56 for electrodes and eight for counter electrodes.

Figure 1:
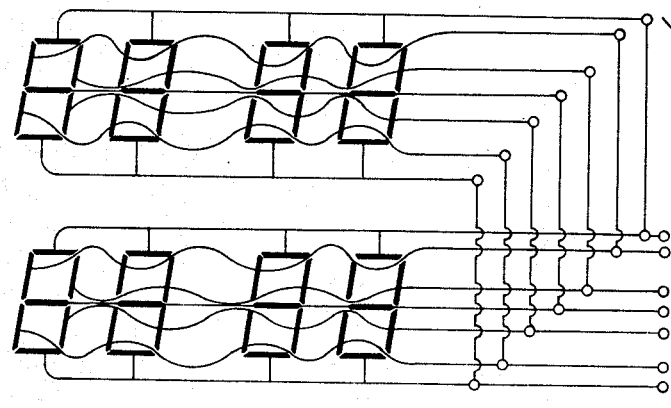
Figure 1:
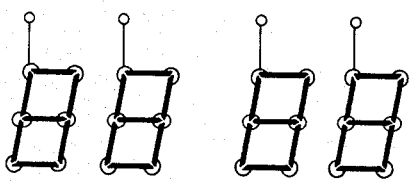
Figure 1:
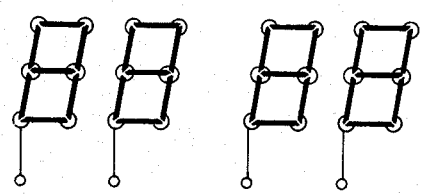

It has also been suggested to interconnect individual digit segments by allowing crossing of conductive tracks with an appropriate isolation being then provided at the crossing points. Such an arrangement, known per se, is illustrated in FIG. 1, so as to permit a comparison with the object of the present invention. This arrangement is difficult and expensive because of the isolation at the crossing points. Moreover, and as shown in FIG. 1, several conductive tracks, and as many as three at the same time, pass between segments of the cells and that is not aesthetic. This last drawback could be eliminated, but at the cost of additional crossing points of the conductive tracks. Likely, one could succeed in eliminating the crossing points, but at the cost of an elongation of the tracks and, with the passage of several tracks between the segments.

In all the cases, the multiplexing is effected digit per digit or, at the most, two digits per two digits.

The object of the present invention is to furnish a conductor-lead-multiplexed display cell wherein the number of outputs is reduced. The display cell of this invention does not have crossing points of the conductive tracks and does not require that a conductive track has to pass between segments of a digit.

In a passive electro-optic display cell according to the present invention is characterized by the fact that at least some digits comprise at least two electrodes and at least two counter-electrodes arranged in such a way that these digits may be activated by the combined activation of said two electrodes and counter-electrodes.

The drawings show, by way of example, two embodiments of the subject of the invention.

Figure 2:
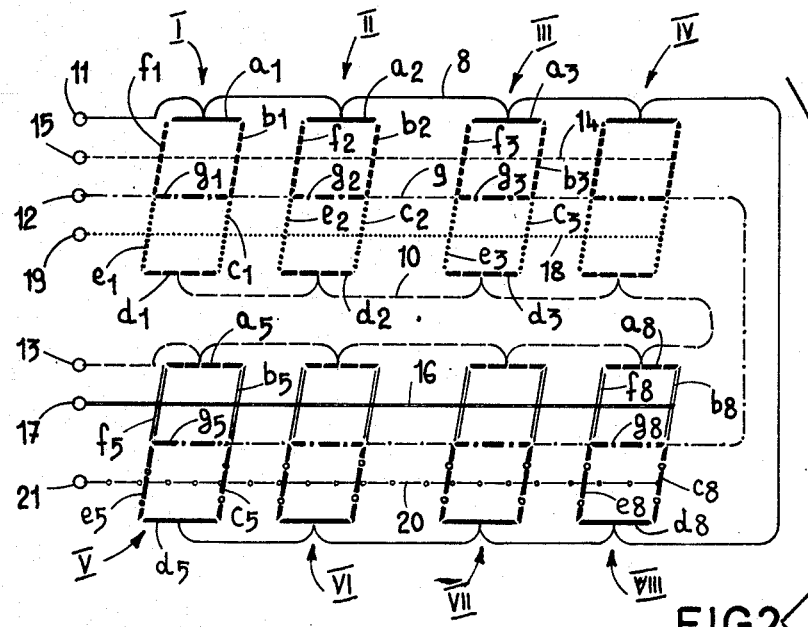
Figure 2:
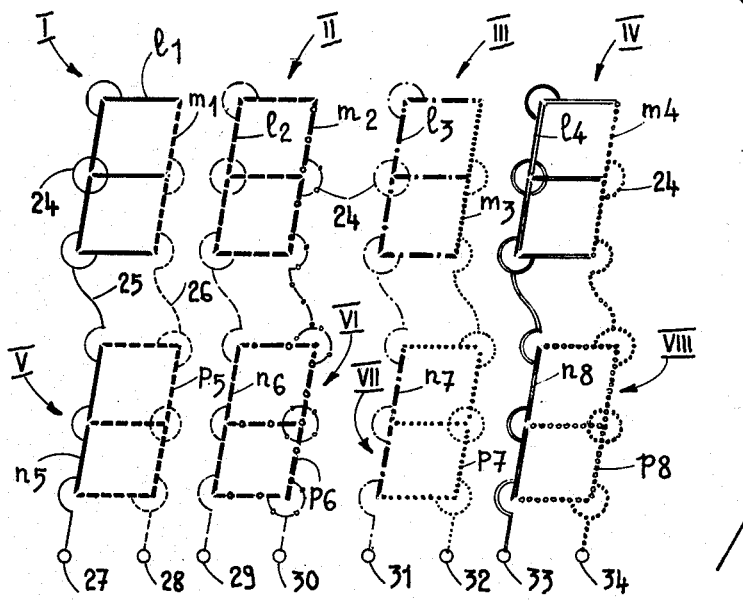
Figure 3:
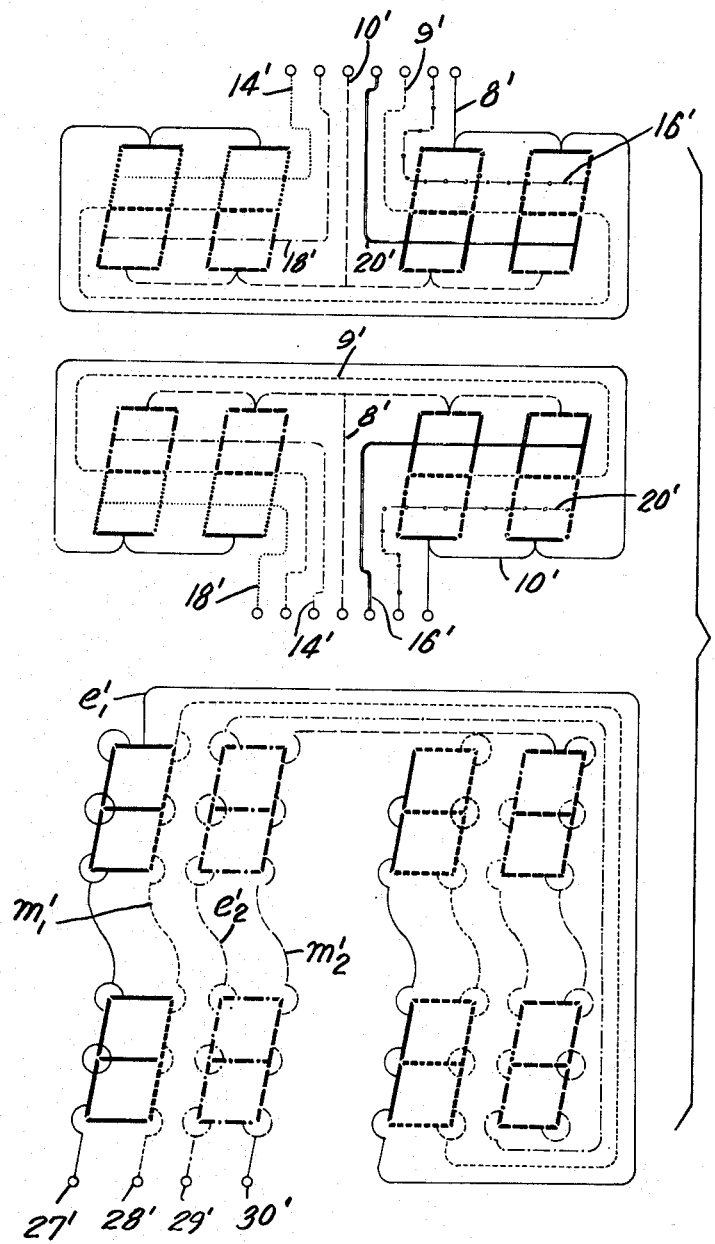

FIG. 2 is a representation of a first embodiment of a passive electro-optic display cell having eight digits, using multiplexed connecting leads and in which the electrodes and counter-electrodes have been represented at a distance from each other for clarity while, in reality, they are superimposed, and FIG. 3 is an analogous representation as in FIG. 2 of a second embodiment of such a display cell, having also eight digits.

It is to be noted that one understands by digit all of the elements permitting display of numbered information. In the case of the two cells, which are disclosed hereafter, these digits are each constituted of seven segments arranged in an "8" pattern to permit display of all of the numbers from "0" to "9".

As shown in FIG. 1 the conventional most simple numbered display arrangements, each digit comprises seven electrodes in the form of seven segments and only one counter-electrode for each whole digit being situated in registration under the electrodes.

In the more sophisticated multiplexed construction of the type represented in FIG. 1, one has seven electrodes for each digit, as in the most simple case hereabove indicated, but one has as many counter-electrodes as there are digits. Thus, in the case represented in FIG. 1, each digit comprises seven electrodes in the form of seven segments arranged in a figure "8" pattern. The respective segments of the several digits are connected to each other. A counter-electrode, constituted of seven segments is also arranged in a figure "8" pattern and is situated under the electrode segments. The counter-electrode segments, however, are all connected to each other.

Each electrode and each counter-electrode is connected to an output in such manner that the number of the outputs is seven for the electrodes and eight for the counter-electrodes, for a total of 15. FIG. 1 shows that the conductive tracks connecting the electrodes to their outputs cross each other. As previously stated, one could eliminate these crossing points, but at the cost of introducing serious drawbacks.

The cell represented in FIG. 2 has eight digits, designated by I, II, III, IV, V, VI, VII and VIII, respectively. The upper portion of this figure represents the electrodes of these eight digits and the lower portion of the counter-electrodes.

The display elements of each digit are constituted by segments, in the number of seven per digit, designated by $a1$, $b1$, $c1$, $d1$, $e1$, $f1$, $g1$; $a2$, $b2$, ... etc., up to $g8$, arranged in a figure "8" pattern for each digit. The electric connections between these segments are realized in such a way that the three parallel segments $a$, $d$, $g$, of each of the first four digits, are connected respectively to the three segments $g$, $d$, $a$ of the four last digits by means of lines 8, 9 and 10, respectively, ending at outputs 11, 12 and 13, respectively.

So far as the other segments $b$, $c$, $e$ and $f$ are concerned, the eight digits are divided in two groups, i.e. a first group including digits, I, II, III and IV and a second group including digits V, VI, VII and VIII. The opposite segments $b$ and $f$ of each digit of one group are connected to each other by a line 14 ending at an output 15, while opposite segments $b$ and $f$ of the second group are connected by a line 16 ending at an output 17.

The two other opposite segments $c$ and $e$ of each digit of one first group are connected to each other by a line 18 ending at an output 19. A line 20 connects the opposite segments $c$ and $e$ for the second group, ending at an output 21.

The control of all eight digits requires seven electrodes while each digit necessitates for its own control only five electrodes.

So far as the counter-electrodes are concerned, each digit comprises two portions of counter-electrodes designed by $l1$ and $m1$, $l2$ and $m2$, ... ertc., up to $l4$ and $m4$, then $n5$ and $p5$, $n6$ and $p6$, ... etc., up to $n8$ and $p8$. The portions $l$ are constituted by the segments $a$, $d$, $e$, $f$ and $g$, connected to each other (for the first group of digits I and IV), while the portions $m$ are constituted by the segments $b$ and $c$, connected to each other for this same group of digits. The portions $p$ are constituted by the segments $a$, $b$, $c$, $d$ and $g$, connected to each other (for the second group of digits V to VIII), while the portions $n$ are constituted by the segments $e$ and $f$ connected to each other for this same second group of digits.

Thus, the portions $l$ (of the digits of the first group) have the same shape as the portions $p$ (of the digits of the second group), but in reversed position with respect to the latter.

It is to be noted, incidentally, that the elements of portions *l, m, p,* and *n* have been represented as distinct segments, connected to each other by electric connections such as the connections 24 of FIG. 2, it being understood that the segments thus realized constitute together a commonly activated portion of the counter-electrode. Incidentally, the same type of connections are employed between counter-electrode segments of FIG. 1.

The connection of the counter-electrodes is such that each portion *l* of one of the digits of the first group is connected, by a line 25, to the portion *n* of one of the digits of the other second group, while each portion *m* of the digits of the first group is connected, by a line 26, to the portion *p* of one of the digits of the second group. Each counter-electrode thus constituted, *l*1–*n*5, *l*2–*n*6, *l*3–*n*7, *l*4–*n*8, *m*1–*p*5, *m*2–*p*6, *m*3–*p*7 and *m*4–*p*8, is connected to one of the eight outputs designated by 27, 28, 29, 30, 31, 32, 33 and 34.

The total number of the outputs of the entire display cell of FIG. 2 is then 15, as with the multiplexed cell of FIG. 1 without, however, any line or conductive track crossing another and without the lines being excessively long or passing between segments.

It is to be noted that, in the example represented, the number of the counter-electrodes is two for each digit, but the number could be higher.

So as to explain the operation of this cell, a practical example is given hereafter, in which the cell displays "08-59-31-36":

The operation of the display cells can be represented by means of matrices like the matrix which is indicated hereafter, in which each horizontal line corresponds to a number and each vertical column to a segment. This matrix has been realized in such a way that, if the intersection of a line and of a column carries a "0", this means that, for the number corresponding to this line, the segment corresponding to the column has not been excited. If, on the contrary, this intersection carries a "1", then this segment is excited.

|   | a | b | c | d | e | f | g |             |
|---|---|---|---|---|---|---|---|-------------|
| 0 | 1 | 1 | 1 | 1 | 1 | 1 | 0 | (digit I)   |
| 8 | 1 | 1 | 1 | 1 | 1 | 1 | 1 | (digit II)  |
| 5 | 1 | 0 | 1 | 1 | 0 | 1 | 1 | (digit III) |
| 9 | 1 | 1 | 1 | 1 | 0 | 1 | 1 | (digit IV)  |
| 3 | 1 | 1 | 1 | 1 | 0 | 0 | 1 | (digit V)   |
| 1 | 0 | 1 | 1 | 0 | 0 | 0 | 0 | (digit VI)  |
| 4 | 0 | 1 | 1 | 0 | 0 | 1 | 1 | (digit VII) |
| 6 | 1 | 0 | 1 | 1 | 1 | 1 | 1 | (digit VIII)|

In the case of a conventional multiplexing (case of FIG. 1), the above matrix indicates directly the operation of the cell, the sweeping being affected line after line. On the contrary, in the case of the cell of FIG. 2, the counter-electrodes are not the equivalent of each digit so that it is necessary to realize a different matrix, which is deduced from the first one and from the configuration of FIG. 2. The matrix, which is hereafter indicated, uses a horizontal line corresponding to an output of a counter-electrode and a vertical column corresponding to an output of an electrode. The arrangement is such that the intersection of a line and of a column corresponds to a segment.

For the previous exemplary display number the name of the segment is in parentheses when the segment is not to be excited. Stated alternatively, when the corresponding counter-electrode is coupled to a voltage, the electrode of this column is not connected. If the name of the segment is not enclosed by parentheses, that means that this segment is to be excited by simultaneously applying a voltage to the electrode and the counter-electrode.

| Outputs of the counter-electrodes | Outputs of the electrodes ||||||| 
|---|---|---|---|---|---|---|---|
|  | 11 | 15 | 12 | 19 | 13 | 17 | 21 |
| 27 | a1 | f1 | (g1) | e1 | d1 | (f5) | (e5) |
| 28 | d5 | b1 | g5 | c1 | a5 | b5 | c5 |
| 29 | a2 | f2 | g2 | e2 | d2 | (f6) | (e6) |
| 30 | (d6) | b2 | (g6) | c2 | (a6) | b6 | c6 |
| 31 | a3 | f3 | g3 | (e3) | d3 | f7 | (e7) |
| 32 | (d7) | (b3) | g7 | c3 | (a7) | b7 | c7 |
| 33 | a4 | f4 | g4 | (e4) | d4 | f8 | e8 |
| 34 | d8 | b4 | g8 | c4 | a8 | (b8) | c8 |

It is to be noted that the perception of the solution is more simple with the conventional cell as shown in FIG. 1 whose operation is directly illustrated by the first matrix.

In the case of the cell of FIG. 2, the electronics specialist who has to conceive the circuit must take into account the fact that, in each line, he will find segments of different digits. As a matter of fact, the very conception of the circuit will be more complicated but, once this circuit is conceived, the realization of the display cell will be easier since no crossing of the conductive tracks occurs in the display cell.

In the embodiment of the display cell of FIG. 3, the total number of the outputs is eighteen, which is slightly more than the number used in the cell of FIG. 2. On the other hand, the embodiment of FIG. 3 requires only four counter-electrode outputs while eight are used in the case of FIG. 2. The reason for this arrangement is that sometimes a time of excitation equal to ⅛ of the display time is not sufficient. By reducing the number of outputs for the counter-electrodes, one can increase the time of excitation. The arrangement of FIG. 3 would be especially suitable for liquid crystal cells.

The general arrangement of the cell of FIG. 3 does not require its disclosure in detail. One will merely note that the cell of FIG. 3 has eight digits, like the one of FIG. 2. Furthermore, the electrodes, in the number of five per digit, have been represented at the upper portion of the drawing while counter-electrodes, in the number of two per digit, are shown at the lower portion of FIG. 3.

One sees that, in this embodiment too, no conductive track crosses another.

Thus, in the two embodiments represented (FIGS. 2 and 3), the combined activation of at least two electrodes and of at least two counter-electrodes activates at least some digits.

What I claim is:

1. A passive electro-optic display cell formed of a plurality of digits, each digit being formed of a plurality of electrodes arranged in a figure eight pattern and at least a pair of counter-electrodes in registration with the electrodes, the improvement comprising a pattern of non-crossing conductor leads selectively interconnecting like electrodes of the respective digits;

said digits being arranged in first and second groups, with at least several of the conductor leads connecting like electrodes in each group and selected ones of said conductor leads interconnecting different electrodes of the group having digit positions in mirror-like image relationships with each other; and with selected ones of counter-electrodes of each digit in one group being electrically coupled to each other and to corresponding counter-electrodes of a digit in the other group.

2. A passive electro-optic display cell formed of a plurality of digits, each digit being formed of a plurality of electrodes arranged in a figure eight pattern formed of three visually generally horizontally arranged electrodes and four visually generally vertically arranged electrodes in registration with the electrodes, the improvement comprising a pattern of non-crossing conductor leads selectively interconnecting like electrodes of the respective digits;

said digits being arranged in first and second groups, with the conductor leads interconnecting like electrodes in each digit of said first and second groups, and with selected ones of the conductor leads interconnecting oppositely located vertically arranged electrodes in each group; and with selected ones of counter-electrodes of each digit in one group being electrically coupled to each other and to corresponding counter-electrodes of a digit in the other group.

3. The display cell as claimed in claim 1 wherein the counter-electrodes for each digit are formed of seven segments which are interconnected into two portions into a figure eight pattern, a first portion including three parallel segments as well as two of the four remaining segments, the second portion including two remaining segments; and wherein the first counter-electrode portion of each digit in one group is connected to a second counter-electrode portion of another digit in the other group.

* * * * *